(12) United States Patent
Kobayashi et al.

(10) Patent No.: US 7,800,342 B2
(45) Date of Patent: Sep. 21, 2010

(54) BATTERY PACK MANAGEMENT APPARATUS

(75) Inventors: Tetsuya Kobayashi, Anjo (JP); Keisuke Tanigawa, Nishio (JP)

(73) Assignee: Denso Corporation, Kariya (JP)

( * ) Notice: Subject to any disclaimer, the term of this patent is extended or adjusted under 35 U.S.C. 154(b) by 183 days.

(21) Appl. No.: 11/730,447

(22) Filed: Apr. 2, 2007

(65) Prior Publication Data

US 2007/0268000 A1 Nov. 22, 2007

(30) Foreign Application Priority Data

Apr. 10, 2006 (JP) ............................. 2006-107179

(51) Int. Cl.
*H02J 7/00* (2006.01)
(52) U.S. Cl. ...................... 320/118; 320/116
(58) Field of Classification Search ................ 320/116, 320/118; 324/426, 433, 434
See application file for complete search history.

(56) References Cited

U.S. PATENT DOCUMENTS

| 6,133,709 | A  |   | 10/2000 | Puchianu |         |
|-----------|----|---|---------|----------|---------|
| 6,268,710 | B1 | * | 7/2001  | Koga     | 320/116 |
| 6,404,166 | B1 |   | 6/2002  | Puchianu |         |
| 6,563,291 | B2 |   | 5/2003  | Tamura et al. |   |
| 6,803,766 | B2 |   | 10/2004 | Kobayashi et al. | |

| 2003/0015995 | A1 | * | 1/2003 | Tamura et al. | 320/162 |
| 2003/0141848 | A1 | * | 7/2003 | Fujiwara | 320/134 |

FOREIGN PATENT DOCUMENTS

| JP | 2000-092733 | 3/2000  |
|----|-------------|---------|
| JP | 2001-307782 | 11/2001 |
| JP | 2002-156392 | 5/2002  |
| JP | 2002-521792 | 7/2002  |
| JP | 2003-032907 | 1/2003  |
| JP | 2005-033951 | 2/2005  |
| JP | 2005-328642 | 11/2005 |

OTHER PUBLICATIONS

Office Action issued Aug. 4, 2009 in corresponding Japanese Application No. 2006-107179 with an at least partial English-language translation thereof.

* cited by examiner

*Primary Examiner*—Edward Tso
*Assistant Examiner*—Ramy Ramadan
(74) *Attorney, Agent, or Firm*—Nixon & Vanderhye, PC (57) ABSTRACT

The battery pack management apparatus for managing a battery pack having a series connection of battery cells is provided with a management unit for each of unit batteries each of which includes a single battery cell or a plurality of adjacent battery cells included in said battery pack. The battery pack management apparatus includes a selection circuit selecting one of the unit batteries, and a voltage detection circuit detecting a voltage across the selected unit battery. The management unit provided for the selected unit battery is configured to perform a management process (discharge process, for example) other than detection of the voltage across the selected unit battery on the selected unit battery.

7 Claims, 9 Drawing Sheets

| | CLK | AND | OR | a1 | a2 | a3 | OUT1 | |
|---|---|---|---|---|---|---|---|---|
| OVERCHARGE | 0 | 0 | 0 | 1 | 0 | 0 | 1 | NORMAL |
| | 0 | 0 | 1 | 0 | 0 | 0 | 0 | AT LEAST ONE CELL IS OVERCHARGED |
| | 0 | 1 | 0 | 0 | 0 | 0 | 0 | ABNORMAL |
| | 0 | 1 | 1 | 0 | 0 | 0 | 0 | ALL CELLS ARE OVERCHARGED |
| OVERDISCHARGE | 1 | 0 | 0 | 1 | 1 | 1 | 1 | ALL CELLS ARE OVERDISCHARGED |
| | 1 | 0 | 1 | 0 | 1 | 0 | 1 | AT LEAST ONE CELL IS OVERDISCHARGED |
| | 1 | 1 | 0 | 0 | 0 | 1 | 1 | ABNORMAL |
| | 1 | 1 | 1 | 0 | 0 | 0 | 0 | NORMAL |

| | CLK | IN | OUT1 | b1 | b2 | b3 | OUT2 | |
|---|---|---|---|---|---|---|---|---|
| OVERCHARGE | 0 | 0 | 0 | 0 | 0 | 0 | 0 | UPPER CELLS AND CELLS IN QUESTION ARE ABNORMAL |
| | 0 | 0 | 1 | 0 | 0 | 0 | 0 | UPPER CELLS ARE ABNORMAL CELL IN QUESTION ARE NORMAL |
| | 0 | 1 | 0 | 0 | 0 | 0 | 0 | UPPER CELLS ARE NORMAL CELLS IN QUESTION ARE ABNORMAL |
| | 0 | 1 | 1 | 1 | 0 | 0 | 1 | NORMAL |
| OVERDISCHARGE | 1 | 0 | 0 | 0 | 0 | 0 | 0 | NORMAL |
| | 1 | 0 | 1 | 0 | 0 | 1 | 1 | UPPER CELLS ARE NORMAL CELLS IN QUESTION ARE ABNORMAL |
| | 1 | 1 | 0 | 0 | 1 | 0 | 1 | UPPER CELLS ARE ABNORMAL CELLS IN QUESTION ARE NORMAL |
| | 1 | 1 | 1 | 1 | 1 | 1 | 1 | UPPER CELLS AND CELLS IN QUESTION ARE ABNORMAL |

BATTERY PACK MANAGEMENT APPARATUS

CROSS-REFERENCE TO RELATED APPLICATION

This application is related to Japanese Patent Application No. 2006-107179 filed on Apr. 10, 2006, the contents of which are hereby incorporated by reference.

BACKGROUND OF THE INVENTION

Field of the Invention

The present invention relates to a battery pack management apparatus for managing states of unit batteries each of which is constituted by a single battery cell or a plurality of adjacent battery cells included in a battery pack, the battery pack being constituted as a serial connection of a plurality of battery cells.

Japanese Patent Application Laid-open No. 2000-92733 discloses such a battery pack management apparatus having a management unit including a discharge path used for discharging battery cells, a discharge switch provided in the discharge path, and flip-flops for on/off controlling the discharge switch. In this management apparatus, to discharge the battery cells, a command signal is sent from a control unit (microcomputer) to the flip-flops through a decoder to turn on the discharge switch.

Japanese Patent Application Laid-open No. 2003-32907 discloses another battery pack management apparatus having a function of detecting overcharge or overdischarge for each of groups of battery cells in response to a command signal sent from a control unit.

In the conventional battery pack management apparatuses as described above, it is necessary to provide a high-voltage insulating device for insulation between the control unit and the management unit for each of different command signals transmitted from the control unit to the management unit, because the management unit is connected to the battery pack generating a high voltage. Accordingly, the conventional battery pack management apparatuses have a problem in that the number of devices for providing insulation between the management unit and the control unit increases as the number of processes to be carried out by the management unit increases, which causes the number of different command signals to increase.

SUMMARY OF THE INVENTION

The present invention provides a battery pack management apparatus for managing a battery pack including a series connection of battery cells, the battery pack management apparatus being provided with a management unit for each of unit batteries each of which includes a single battery cell or a plurality of adjacent battery cells included in the battery pack, the battery pack management apparatus comprising:

a selection circuit selecting one of the unit batteries; and a voltage detection circuit detecting a voltage across the selected unit battery;

wherein the management unit provided for the selected unit battery is configured to perform a management process other than detection of the voltage across the selected unit battery on the selected unit battery.

In accordance with the present invention in which, when the selection circuit selects any one of the unit batteries to detect an inter-terminal voltage of this one of the unit batteries, the management unit assigned to this selected unit battery performs a management process on the selected unit battery other than the voltage detection process. Since it means that a command signal commanding to perform the voltage detection process, and a command signal commanding the management unit to perform a management process (discharge process, for example) other than the voltage detection process can be transmitted through the same line, it becomes unnecessary to additionally provide a device for providing insulation between the control circuit (microcomputer) and the management unit to enable transmitting the command signal commanding the management unit to perform the management process.

The voltage detection circuit may include a flying capacitor, the selection circuit may be configured to connect both terminals of the flying capacitor to both terminals of the selected unit battery through a connection line, and the management unit may be configured to perform the management process in accordance with presence of a current on the connection line.

The management unit may include a conversion circuit converting the current on the connection line into a voltage, and a latch circuit latching the voltage converted by the conversion circuit. In this case, an output of the latch circuit is used as a command signal commanding the management unit to perform the management process.

The battery cells may be rechargeable batteries. In this case, the management unit may include a discharge path through which the selected unit battery is discharged, a discharge switch making a closed loop between the selected unit battery and the discharge path when being turned on, and a drive circuit turning on the discharge switch to thereby discharge the selected unit battery in response to the command signal.

The battery pack management apparatus may include a control circuit outputting a clock signal, and the management unit may include a comparator circuit comparing the voltage across the selected unit battery with one of two different threshold values selected in accordance with a logic value of the clock signal, and outputting a comparison result signal indicative of whether or not the selected unit battery is in an overcharged state or an overdischarged state to the control unit, and an inhibition circuit inhibiting the discharge switch from being turned on while the management unit is supplied with the clock signal from the control circuit.

Other advantages and features of the invention will become apparent from the following description including the drawings and claims.

PREFERRED EMBODIMENTS OF THE INVENTION

First Embodiment

Figure 1:
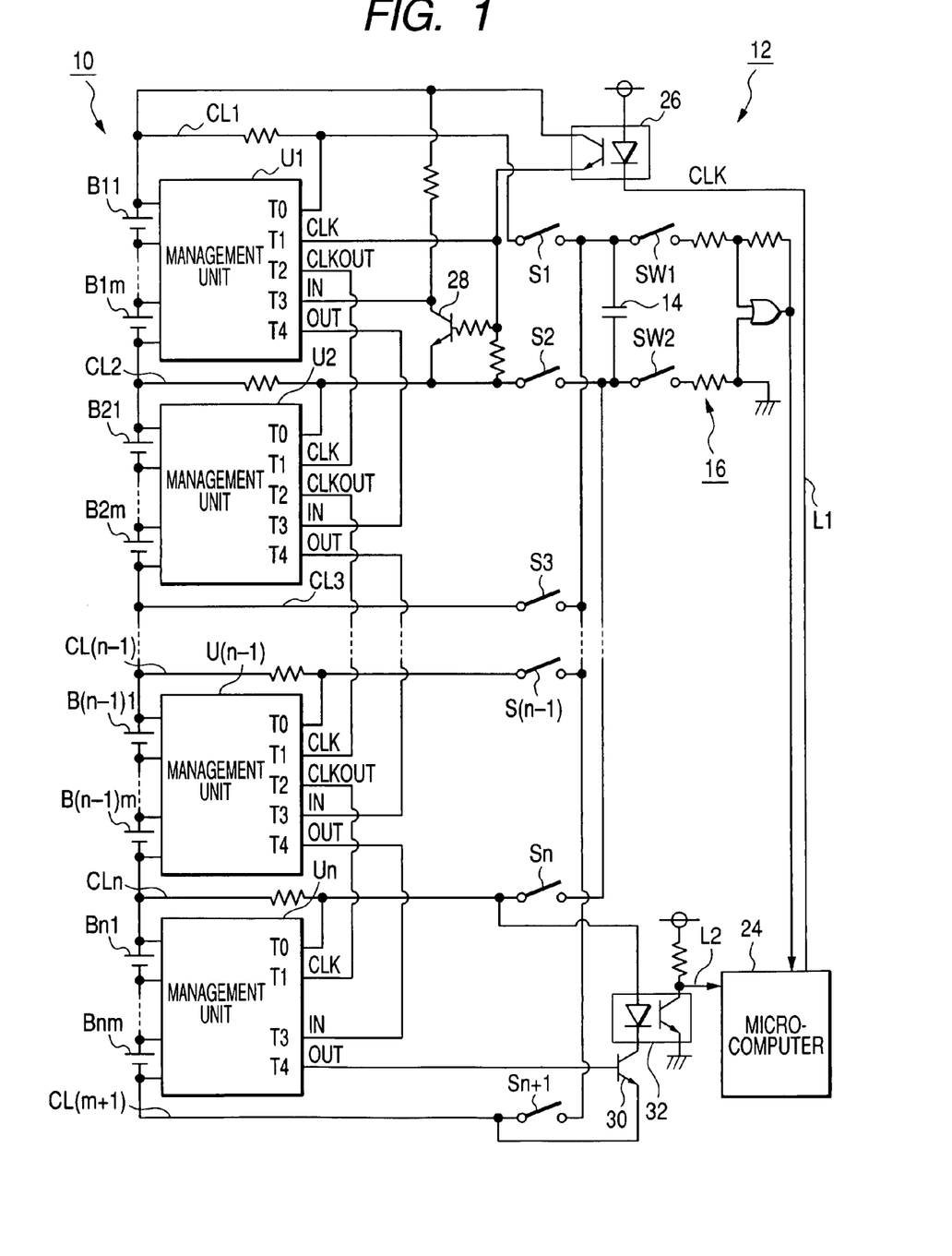
FIG. 1 is a diagram showing a structure of a battery pack and a battery pack management apparatus according to a first embodiment of the invention, which are mounted on a hybrid vehicle.

FIG. 1 is a diagram showing a structure of a battery pack 10 and a battery pack management apparatus 12 according to a first embodiment of the invention, which are mounted on a hybrid vehicle.

The battery pack 10 is constituted as a series connection of m×n lithium rechargeable batteries (battery cells) B11 to Bnm. The battery pack 10 serves to receive and accumulate therein electric power generated by a vehicle-mounted motor-generator during braking of the vehicle, and to supply the accumulated electric power to a low-voltage (12V, for example) battery mounted on the vehicle through a DC/CD converter. The battery pack 10 serves to also supply electric power to the motor-generator during acceleration of the vehicle.

In this embodiment, the battery cells B11 to Bnm are divided into n blocks, these blocks respectively including battery cells B11 to B1m, . . . , Bn1 to Bnm (n and m being an integer equal to or larger than 2). The management apparatus 12 has a flying capacitor 14 for selectively detecting an inter-terminal voltage of each block. Two terminals of the flying capacitor 14 can be electrically connected to two terminals of one of the n blocks including battery cells Bi1 to Bim(i=1 to n) selected by use of connection lines CL1 to CL(n+1) and switching devices S1 to S(n+1). The conduction states of the switching devices S1 to S(n+1) are controlled by a microcomputer. It should be noted that connection correspondence between the two terminals of one block and the two terminals of the flying capacitor 14 is opposite in polarity to that of another block adjacent to this one. The voltage across the flying capacitor 14 is detected by a voltage detector circuit 16 through switching devices SW1, SW2. The detected voltage across the flying capacitor 14 is read by the microcomputer 24.

Each of the switching devices S1 to S(n+1) and the switching devices SW1, SW2 is a high-voltage insulating device which is capable of providing electrical insulation between the microcomputer 24 side and the battery pack 10 side, and operating on a low voltage as low as several times a voltage across one battery cell. This high-voltage insulating device may be a photo-MOS relay.

The management apparatus 12 further includes management units U1 to Un for managing the n blocks. Each management unit Ui (i=1 to n) has a clock input terminal T1 for receiving a clock signal CLK, a clock output terminal T2 for outputting the clock signal CLK converted into a current signal, an input terminal T3 for receiving a composite signal (to be explained later) outputted from the adjacent management unit Uj(j=i+1), and an output terminal T4 for delivering a composite signal.

The microcomputer 24 outputs the clock signal CLK, as a command signal commanding the management units U1 to Un to monitor the states of the battery cells. To be more precise, the microcomputer 24 delivers the clock signal CLK to the clock input terminal T1 of the management unit U1, which is the uppermost one of the management units U1 to Un, through a photocoupler 26. The photocoupler 26 is a device for providing insulation between the high voltage generating battery pack 10 and the low-voltage driven microcomputer 24.

Upon receiving the clock signal CLK, each management unit Ui monitors one of two different states of its battery cell Bi1 to Bim depending on the logical state of the clock signal CLK. In this embodiment, when the clock signal CLK is at the L level, the management unit Ui monitors whether or not the inter-terminal voltage of the block of the battery cells Bi1 to Bim is excessively high (overcharged state). On the other hand, when the clock signal CLK is at the H level, the management unit Ui monitors whether or not the inter-terminal voltage of the block is excessively low (overdischarged state). The management unit Ui outputs, from the output terminal T4, a composite signal containing a signal indicative of a monitor result, and a composite signal outputted from the upper adjacent management unit Uj(j=i+1).

A photo receiving element of the photo coupler 26, which is connected at its collector to the positive electrode side of the battery pack 10, outputs the clock signal CLK from its emitter. The management apparatus 12 further includes a transistor 28 having a collector and an emitter connected in series between the positive electrode side of the battery pack 10 and a negative terminal side of the block containing the battery cells B11 to B1m. This transistor 28 is applied at its base a voltage depending on the clock signal CLK, so that a collector voltage of the transistor 28 is applied to the input terminal T3 of the uppermost management unit U1 as a signal indicative of whether or not the battery cells B11 to Bnm are in the normal state. The uppermost management unit U1 outputs, from the output terminal T4 thereof, a composite signal containing the signal applied to the input terminal T3 thereof and a signal indicative of the monitor result.

Each management unit Ui(i=2 to n) other than the uppermost management unit 1 receives, at its clock input terminal T1, the signal outputted from the clock output terminal T2 of the upper adjacent management unit U(i−1), and also receives at its input terminal T3, the composite signal outputted from the output terminal T4 of the upper adjacent management unit U(i−1). And each management unit other than the uppermost management unit U1 monitors one of the two different states of the battery cells depending on the logical state of the clock signal received at its clock input terminal T1, and outputs, from its output terminal T4, the composite signal containing the signal indicative of the monitor result and the composite signal received at its input terminal T3

The composite signal outputted from the output terminal T4 of the lowermost management unit Un is applied to the base of a transistor 30. The transistor 30 is connected at its emitter to the negative electrode side of the battery pack 10, and connected at its collector to the positive terminal side of the block including the battery cells Bn1 to Bnm through a light emitting diode of a photocoupler 32. Accordingly, the composite signal outputted from the lowermost management unit Un is supplied to the microcomputer 24 through the photocoupler 32 and a serial line L2. The photocoupler 32 is a device for providing insulation between the microcomputer 24 side and the battery pack 10 side.

Of all the management units, only the lowermost management unit Un does not have the clock output terminal T2.

Figure 2:
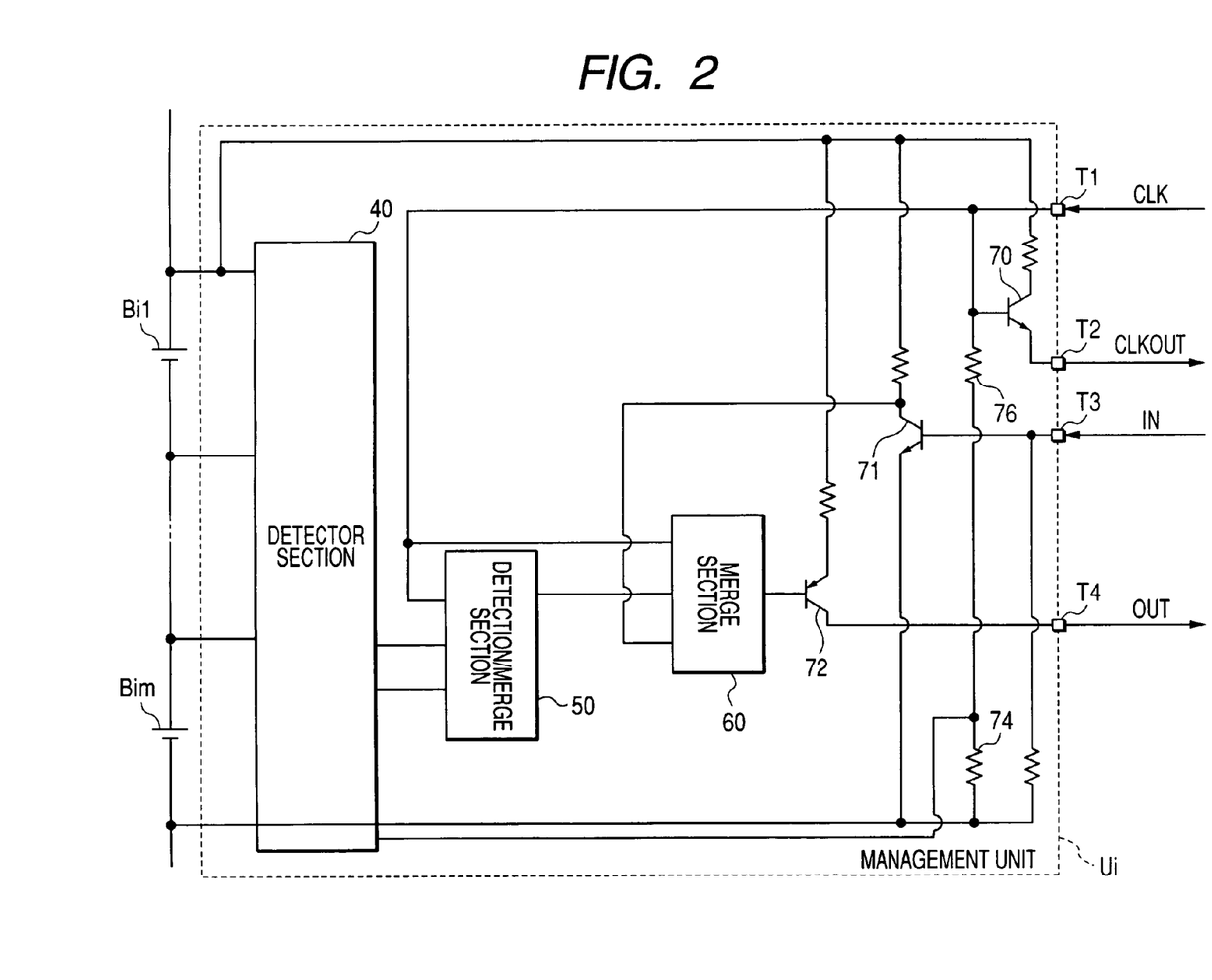
FIG. 2 is a diagram showing a structure of a part of one of management units included in the management apparatus shown in FIG. 1, which is for performing monitoring of the overcharged state and the overdischarged state of battery cells.

FIG. 2 is a diagram showing a structure of a part of each management unit Ui(i=1 to n), which is for performing the monitoring process of the overcharged state and the overdischarged state.

As shown in this figure, the clock signal CLK received at the clock input terminal T1 is applied to the base of a transistor 70. The transistor 70 is connected at its collector to the positive terminal side of the block including the battery cells Bi1 to Bim, and connected at its emitter to the clock output terminal T2, so that the clock signal received at the clock input terminal T1 thereof is sent to the lower adjacent management unit Uj(j=i+1) through the clock output terminal T2 thereof, except the lowermost management unit Un which does not have the clock output terminal T2.

The states of the m battery cells Bi1 to Bim(i=1 to n) are detected by a detector section 40. The detector section 40 integrates these detected states into two signals, and output them to a detection/merge section 50. The detection/merge section 50 logically merges the two signals outputted from the detector section 40, and the clock signal CLK received at the clock input terminal T1 into a monitor result signal, and outputs it to a merge section 60. The merge section 60 receives, in addition to the monitor result signal, the clock signal CLK received at the clock terminal T1, and the composite signal outputted from of the upper adjacent management unit Uj(j=i−1) received at the input terminal T3 except for the management unit U1 that receives the collector voltage of the transistor 28 at its input terminal T3. In more detail, in each management unit Ui, the input terminal T3 is connected to a base of a transistor 71 whose collector and emitter are connected in series across the block containing the battery cell Bi1 to Bim. Accordingly, a current depending on the signal applied to the base of the transistor 71 flows through the collector-emitter path of the transistor 71. And the collector voltage of the transistor 71 is received by the merge section 60.

The merge section 60 logically merges these three signals, and applies it to the base of a transistor 72 which is connected to the positive terminal side of the block including the battery cell Bi1 to Bim at its emitter, and connected to the output terminal T4 at its emitter. Accordingly, the output voltage signal of the merge section 60 is converted into a current signal by the transistor 72, and outputted to the outside as the composite signal.

Figure 3:
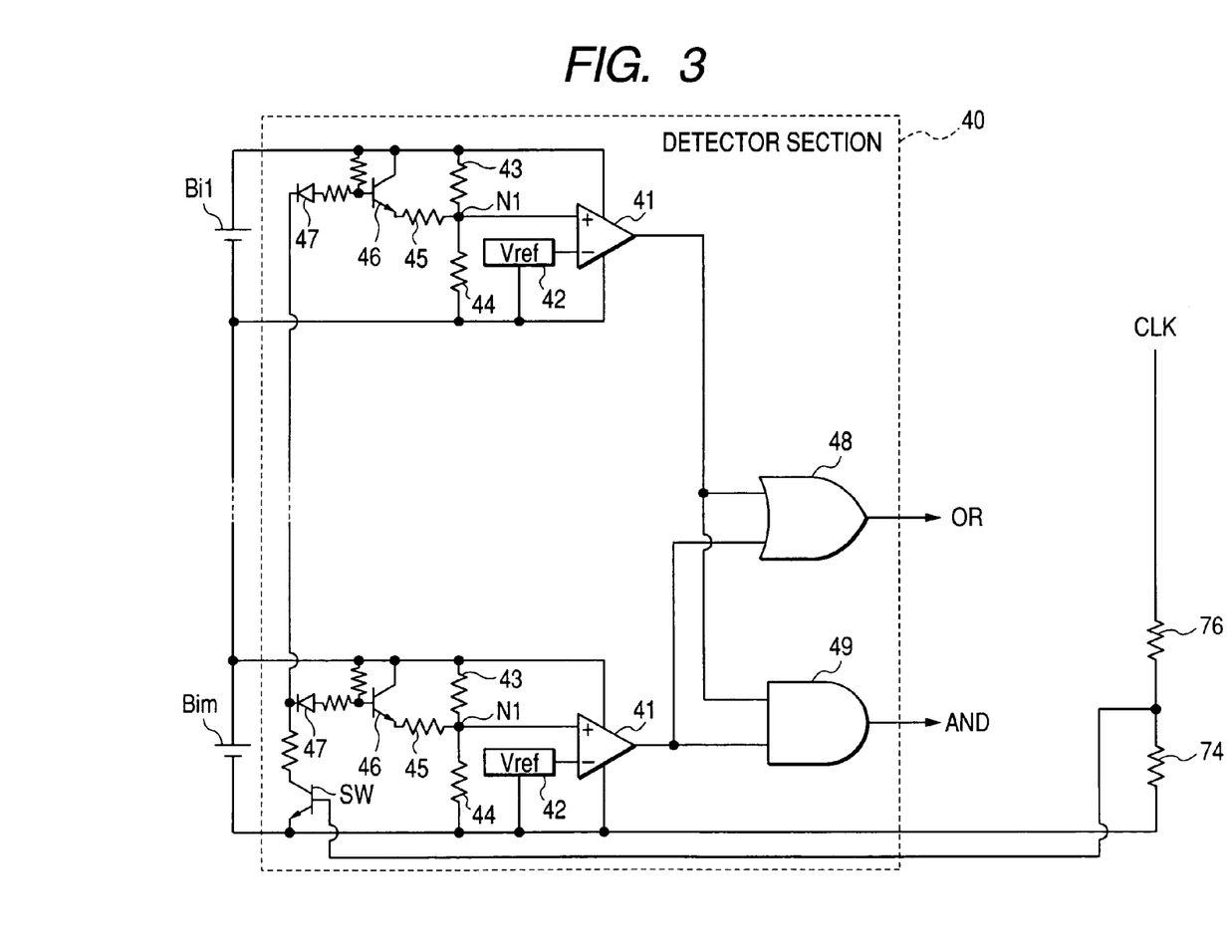
FIG. 3 is a diagram showing a structure of a voltage detector section included in the management unit shown in FIG. 2.

FIG. 3 is a diagram showing a structure of the detector section 40.

The detector section 40 has a comparator 41 for each of the battery cells Bij(j=1 to m), the comparator 41 operating to make a comparison between an inter-terminal voltage of a corresponding battery cell and a predetermined threshold voltage. The comparator 41 has an inverting input terminal to which a reference voltage Vref which a reference voltage source 42 generates on the basis of a negative terminal voltage of the corresponding battery cell is applied, and a non-inverting input terminal to which a divided version of the inter-terminal voltage of the corresponding battery cell is applied.

More specifically, a series of a resistor 43 and a resistor 44 is connected across the corresponding battery cell Bij. And a connection node N1 between these resistors 43, 44 is connected to the non-inverting input terminal of the comparator 41. The positive terminal of the corresponding battery cell Bij is connected to the collector of a transistor 46 whose emitter is connected to the connection node N1 through a resistor 45. The base of the transistor 46 is connected to the negative terminal side of the block including the battery cells Bi1 to Bim through a diode 47 and a collector-emitter path of a switching device SW.

The switching device SW is driven in synchronization with the clock signal CLK. In more detail, the clock input terminal T1 is connected to the negative terminal side of the block including the battery cells Bi1 to Bim through resistors 74, 76, the connection node between them being connected to the base of the switching device SW. Accordingly, the switching device SW is turned on when the clock signal CLK is at the H level to turn on the transistor 46. When the transistor 46 is tuned on, the voltage at the connection node N1 changes. The reason for this is explained below.

Here, it is assumed that resistance values of the resistors 43, 44, 45 are R1, R2, R3, respectively, and the voltage value of the inter-terminal voltage of the corresponding battery cell Bij (j=1 to m) is V. When the transistor 46 is in the off state, the voltage at the connection node N1 is equal to $V \times R2/(R1+R2)$. On the other hand, when the transistor 46 is in the on state, the voltage at the connection node N1 is equal to $V \times R2/\{R2 \times R3/(R2+R3)+R2\}$. Accordingly, the voltage value applied to the non-inverting input terminal of the comparator 41 changes when the transistor 46 is turned on. Hence, by turning on the transistor 46, it becomes possible to obtain the same effect obtained by lowering the threshold voltage which is compared with the inter-terminal voltage of the corresponding battery cell Bij(j=1 to m). In this embodiment, the threshold voltage when the clock signal CLK is at the H level is used as a basis for detecting the overdischarged state, and the threshold voltage when the clock signal CLK is at the L level is used as a basis for detecting the overcharged state.

An OR circuit 48 generates a logical sum signal of the outputs of the m comparators 41. On the other hand, an AND circuit 49 generates a logical product signal of the outputs of the m comparators 41. The logical sum signal and the logical product signal are supplied to the detection/merge section 50.

Figure 4A:
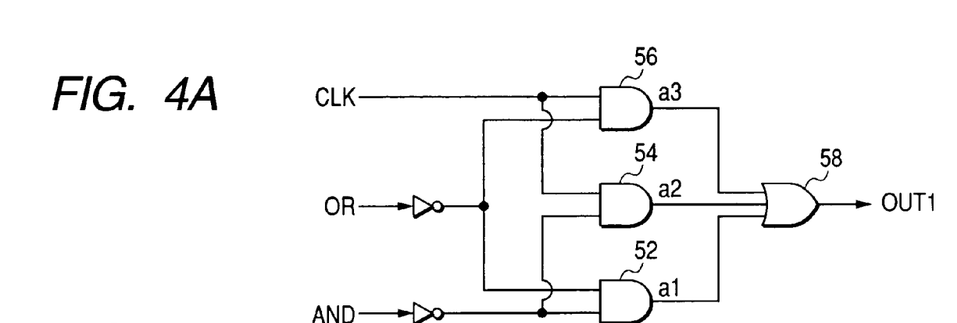
FIG. 4A is a diagram showing a structure of a detection/merge section included in the management unit shown in FIG. 2.

FIG. 4A is a diagram showing a structure of the detection/merge section 50. As shown in this figure, the detection/merge section 50 includes an AND circuit 52 generating a logical product signal a1 of the inverted version of the logical sum signal outputted from the OR circuit 48 and the inverted version of the logical product signal outputted from the AND circuit 49, an AND circuit 54 generating a logical product signal a2 of the clock signal CLK and the inverted version of the logical product signal outputted from the AND circuit 49, and an AND circuit 56 generating a logical product signal a3 of the clock signal CLK and the inverted version of the logical sum signal outputted from the OR circuit 48. An OR circuit 58 generates a logical sum signal OUT1 of these logical product signals a1 to a3.

Figure 4B:
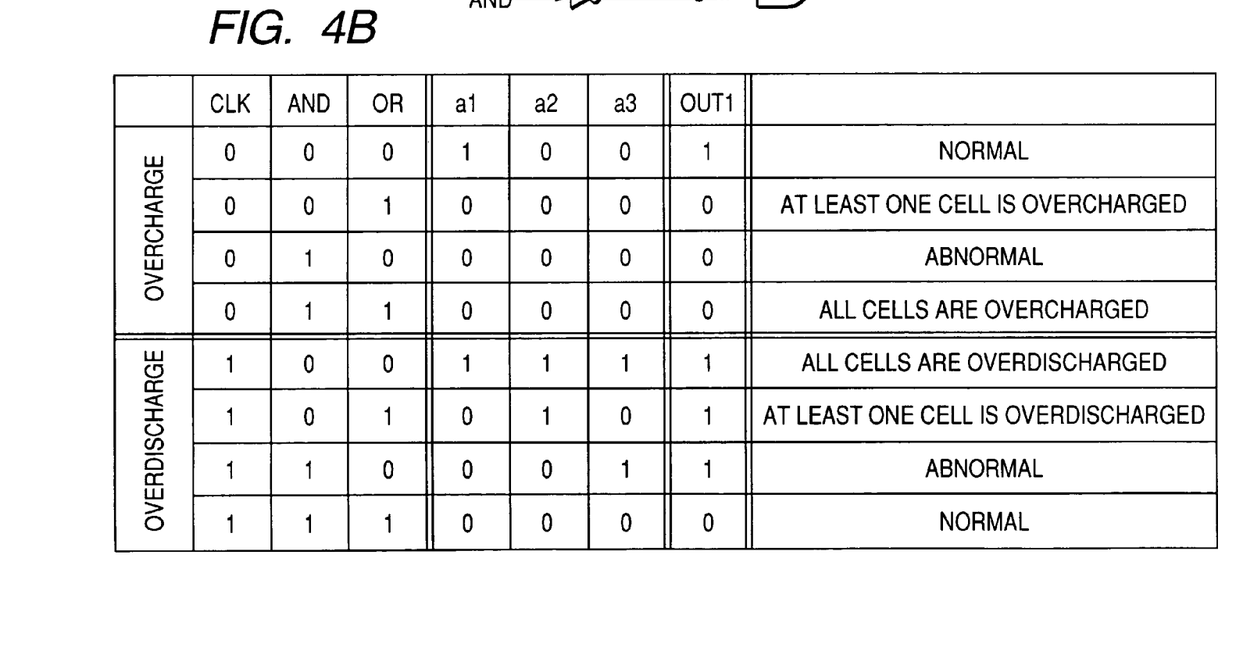
FIG. 4B is a diagram showing relationships among various signals in the detection/merge section shown in FIG. 4A.

FIG. 4B is a diagram showing relationships between the states of the battery cells Bi1 to Bim included in the same block, and the states of the clock signal CLK, logical product signal AND generated by the AND circuit 49, logical sum signal OR generated by the OR circuit 48, logical product signals a1 to a3, and logical sum signal OUT1. As shown in this figure, when the clock signal CLK is at the L level to detect the overcharged state, if the logical sum signal OUT1 is at the H level, it means that none of the battery cells Bi1 to Bim are overcharged. Reversely, if the logical sum signal OUT1 is at the L level at this time, it means that at least one of the battery cells Bi1 to Bim is in the overcharged state, or the management unit Ui is out of order.

On the other hand, when the clock signal CLK is at the H level to detect the overdischarged state, if the logical sum signal OUT1 is at the L level, it means that none of the battery cells Bi1 to Bim are overdischarged. Reversely, if the logical sum signal OUT1 is at the H level at this time, it means that at least one of the battery cells Bi1 to Bim is overdischarged, or the management unit Ui is out of order.

The logical sum signal OUT1, which is a signal indicative of the result of the monitoring process on the battery cells Bi1 to Bim within the same block, and the signal received at the input terminal T3 are logically merged by the merge section 60.

Figure 5A:
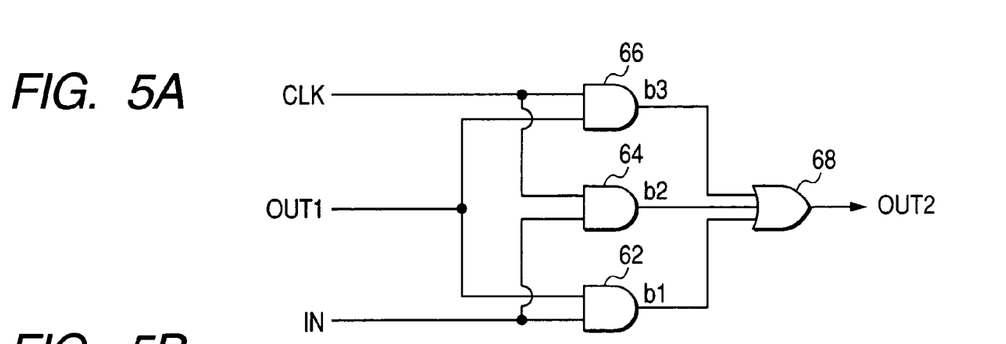
FIG. 5A is a diagram showing a structure of a merge section included in the management unit shown in FIG. 2.

FIG. 5A is a diagram showing a structure of the merge section 60.

As shown in this figure, the merge section 60 includes an AND circuit 62 generating a logical product signal b1 of the logical sum signal OUT1 and the input signal IN received at the input terminal T3, an AND circuit 64 generating a logical product signal b2 of the clock signal CLK and the input signal received at the input terminal T3, and an AND circuit 66 generating a logical product signal b3 of the clock signal CLK and the logical sum signal OUT1. An OR circuit 68 generates a logical sum signal OUT2 of these logical product signals b1 to b3.

Figure 5B:
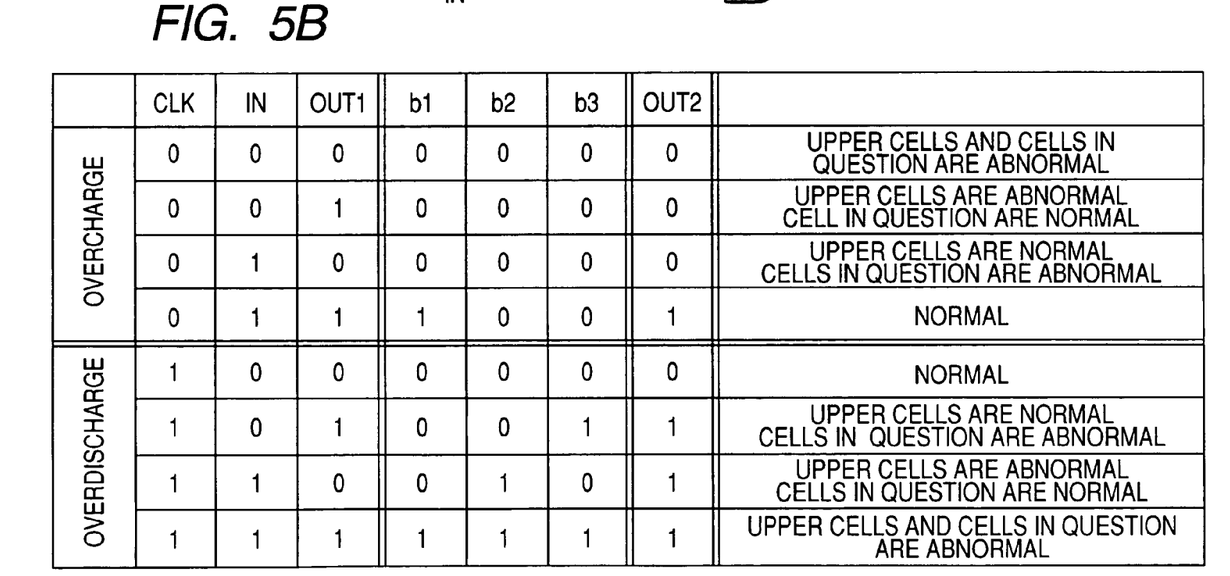
FIG. 5B is a diagram showing relationships among various signals in the merge section shown in FIG. 5A.

FIG. 5b is a diagram showing relationships between the states of the battery cells included in the battery pack 10, and the states of the clock signal CLK, input signal IN received at the input terminal T3, logical sum signal OUT1, logical product signals b1 to b3, and logical sum signal OUT2. As shown in this figure, when the clock signal CLK is at the L level to detect the overcharged state, if the logical sum signal OUT2 is at the H level, it means that the management unit Ui is in order, and none of the battery cells monitored by the management unit Ui and the battery cells monitored by the upper adjacent management unit Uj(j=i−1) are overcharged. Conversely, if the logical sum signal OUT2 is at the L level at this time, it means that the management unit Ui is out of order, or at least one of the battery cells monitored by the management unit Ui and the battery cells monitored by the upper adjacent management unit Uj is overcharged.

On the other hand, when the clock signal CLK is at the H level to detect the overdischarged state, if the logical sum signal OUT2 is at the L level, it means that the management unit Ui is in order, and none of the battery cells monitored by the management unit Ui and the battery cells monitored by the upper adjacent management unit Uj(j=i−1) are overdischarged. Conversely, if the logical sum signal OUT2 is at the H level at this time, it means that he management unit Ui is out of order, or at least one of the battery cells monitored by the management unit Ui and the battery cells monitored by the upper adjacent management unit Uj(j=i−1) is overdischarged.

As explained above, the microcomputer 24 can command the management unit Ui to perform the monitoring process of one of the overcharged state and the overdischarged state by delivering the clock signal CLK to the serial line L1, and receive the monitor results through the serial line L2.

As explained below with reference to FIG. 6, the management unit Ui has also a function of, when the inter-terminal voltage of a specific block including the battery cells Bi1 to Bim is fairly higher than that of the others, discharging this one, so that the inter-terminal voltages of all the blocks are equalized.

Figure 6:
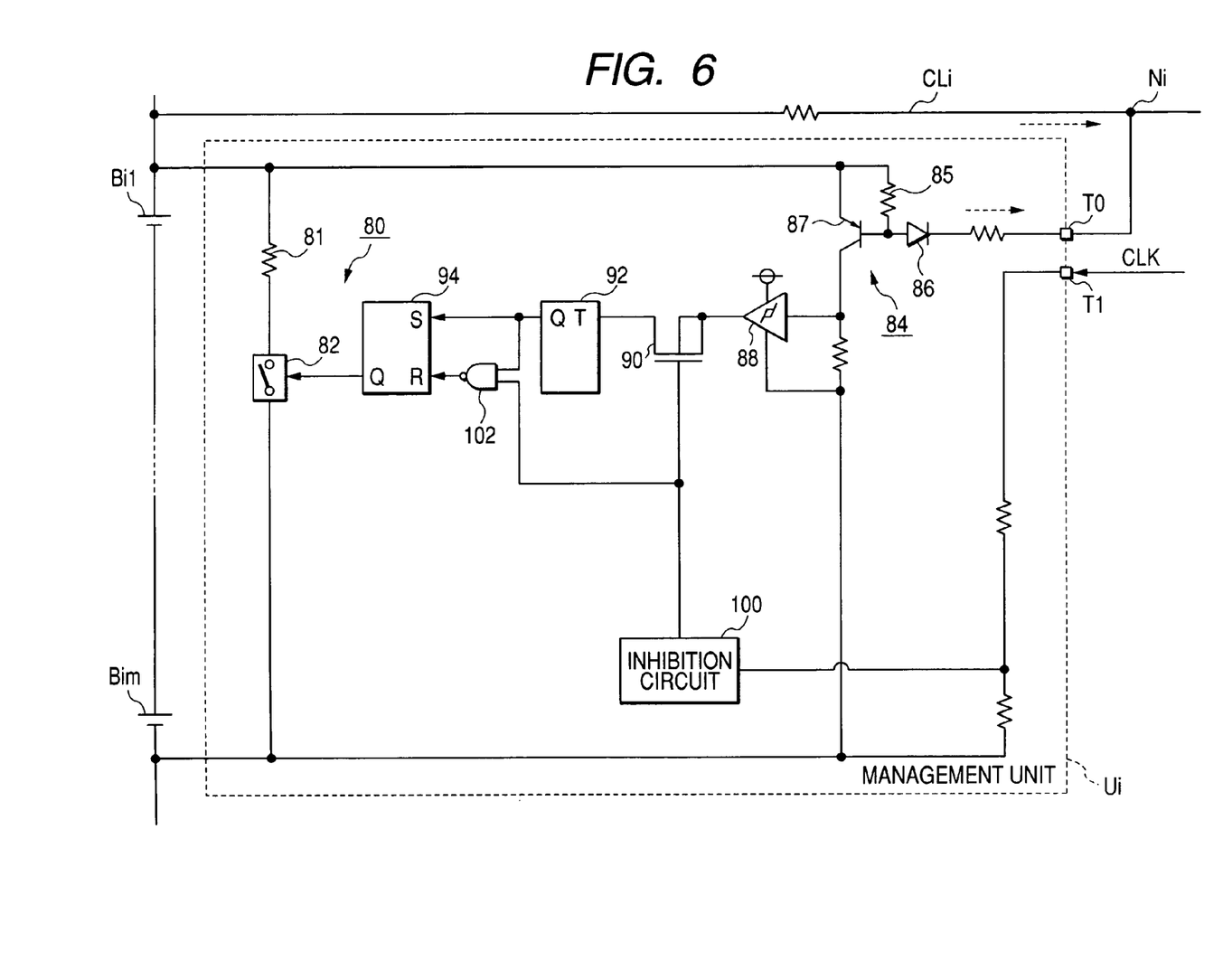
FIG. 6 is a diagram showing a structure of a part of the management unit shown in FIG. 2, which is for performing a discharge operation on battery cells.

FIG. 6 is a diagram showing a structure of a part of the management unit Ui, which is for performing discharge operation to equalizes the inter-terminal voltages of all the blocks.

As shown in this figure, the management unit Ui is provided with a discharge path 80 including a series connection of a resistor 81 and a discharge switch 82 connected across the block including the battery cells Bi1 to Bim. When the discharge switch 82 is turned on, the battery cells Bi1 to Bim and the discharge path 80 make a closed loop circuit, as a consequence of which the battery cells Bi1 to Bim are discharged.

In this embodiment, a command signal for on/off controlling the discharge switch 82 is transmitted as a current flowing through the connection line CLi as explained below. When the switching device Si and the switching device S(i+1) are selectively set in the on state, a current flows from the battery cells Bi1 to Bim to the flying capacitor 14 through the connection line CLi. When the battery cells Bi1 to Bim, the connection line CLi, the flying capacitor 14, and the connection line CL(i+1) make a closed loop circuit, the current flows in the direction from the positive terminal side of the block including the battery cells Bi1 to Bim to the flying capacitor 14, because the connection line CLi-side terminal of the flying capacitor 14 is always at the low voltage level.

The current flowing through the connection line CLi is received by a level conversion circuit 84 through a monitor terminal T0 connected to the node Ni. To be more precise, the level conversion circuit 84 operates to convert the signal appearing at the monitor terminal T0 into a signal having an operating voltage level of logic circuits in the management unit Ui.

The level conversion circuit 84 includes a resistor 85 and a diode 86 allowing a current to flow from the positive side terminal of the block including the battery cells Bi1 to Bim into the monitor terminal T0 when the current flows through the connection line CLi. The base current of a transistor 87 whose collector and emitter are connected respectively to the positive side terminal and the negative side terminal of the block including the battery cells Bi1 to Bim depends on the current flowing through the resistor 85 and the diode 86. Hence, the collector current of the transistor 87 makes a level converted version of the current flowing through the resistor 85 and the diode 86. The collector current of the transistor 87 is converted into a voltage signal of a predetermined voltage by a buffer circuit 88. An output signal of the buffer circuit 88 makes an output signal of the level conversion circuit 84.

An output terminal of the buffer circuit 88 is connected to a T input terminal of a T flip-flop 92 through a source-drain path of an N-channel MOS transistor 90. The T flip-flop 92 has such a latch function that when a signal inputted to the T input terminal thereof changes periodically, it outputs a binary signal whose logical value changes in the same period. The output signal of the T flip-flop 92 makes a command signal commanding the discharge switch 82 to turn on in order to perform the discharge process. By using the T flip-flop 92 having the latch function, it becomes possible to generate the command signal having a constant logic level, even though the current flowing through the connection line CLi decays with time.

The output signal of the T flip-flop 92 is applied to a set terminal of an RS flip-flop 94 whose output terminal is connected to a conduction control terminal (gate or base, for example) of the discharge switch 82. When a signal at the H level is applied to the set terminal of the RS flip-flop 94, the discharge switch 82 is turned on. Accordingly, when a current starts to flow through the connection line CLi, causing the output level of the T flip-flop 92 to become H level, the discharge switch 82 is turned on to discharge the battery cells Bi1 to Bim.

According to this embodiment where a discharge command is transmitted as a current on the connection line CLi, or transmitted as the selection states of the switching devices S1 to S(n+1), it becomes unnecessary to additionally provide a member providing insulation between the microcomputer 24 and the management unit Ui for transmitting the discharge command. However, in the configuration described above, there is a possibility that the discharge command is transmitted unintentionally each time detection of the voltage across the block including the battery cells Bi1 to Bim is performed by use of the flying capacitor 14 as explained below.

Figure 7:
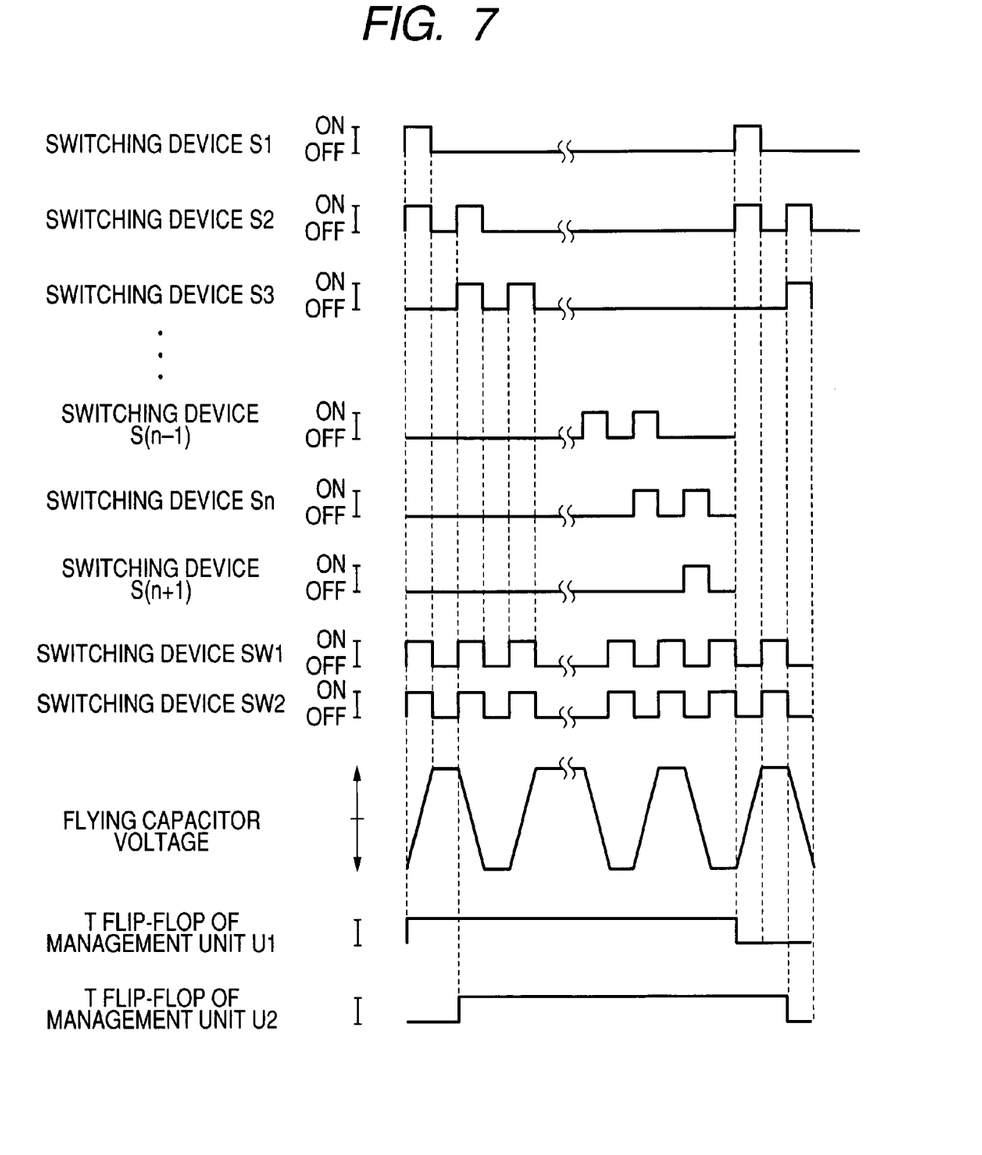
FIG. 7 is a timechart for explaining the voltage detection operation performed by the battery pack management apparatus according to the first embodiment of the invention.

FIG. 7 is a diagram showing changes with time of the states of the switching devices S1 to S(n+1) and the switching devices SW1, SW2, the voltage of the flying capacitor 14, and changes with time of the output of the T flip-flop 92 of the management unit Ui, when it is assumed that the T flip-flop 92 operates directly in accordance with whether or not a current flows through the connection line CLi.

As shown in this figure, to detect the voltage across the block including the battery cells Bi1 to Bim, the switching devices Si, S(i+1) are turned on, so that the voltage across the block including the battery cells Bi1 to Bim is applied to the flying capacitor 14. After an elapse of time estimated to be required for the voltage across the flying capacitor 14 to become equal to the voltage across the block including the battery cells Bi1 to Bim, the switching devices Si, S(i+1) are turned off, and the switching devices SW1, SW2 are turned on. After that, the voltage detector circuit 16 detects the voltage across the flying capacitor 14, and supplies the detected voltage to the microcomputer 24. The reason why the switching devices SW1, SW2 are turned on after the switching devices Si, S(i+1) are turned off is that it is necessary to provide insulation between the microcomputer 24 and the battery pack 10.

Next, in order to detect a voltage across the adjacent block including the battery cells BJ1 to Bjm(j=i+1), the switching devices SW1, SW2 are turned off, and then the switching devices Sj, S(j+1) are turned on to apply the voltage across the block including the battery cells Bj1 to Bjm to the flying capacitor 14. As a result, the voltage across the flying capacitor 14 inverts. That is because, as already explained, in this embodiment, the connection correspondence between the two terminals of one block and the two terminals of the flying capacitor 14 is opposite in polarity to that of another block adjacent to this one.

Accordingly, the T flip-flop 92 of the management unit Ui is kept at the logic H level from the time when the switching devices Si, S(i+1) are turned on to the time when the switching devices Si, S(i+1) are turned on next time.

As understood from the above explanation, there is a possibility that the discharge process is performed unintentionally in the management unit Ui, because the output of the T flip-flop 92 of the management unit Ui can invert each time the voltage across the block including the battery cells Bi1 to Bim is detected by use of the flying capacitor 14. Normally, the discharge process is performed only when an ignition switch of the vehicle is in the off state. However, as explained above, there is a possibility that the discharge process is mistakenly performed when the ignition switch is in the on state, if the voltage across the block including the battery cells Bi1 to Bim is detected by use of the flying capacitor 14. To avoid this, in this embodiment, the discharge process is inhibited irrespective of whether or not a current flows through the connection line CLi when the ignition switch is in the on state.

To this end, as shown in FIG. 6, this embodiment is provided with an inhibition circuit 100 inhibiting the discharge process when the ignition switch is in the on state. Since the clock signal CLK is constantly supplied to the management unit Ui while the ignition switch is in the on state, the inhibition circuit 100 makes a determination as to whether or not the ignition switch is in the on state on the basis of whether or not the clock signal CLK is being inputted through the clock input terminal Ti. The inhibition circuit 100 applies a signal at the L level to the gate of the transistor 90 to turn off the transistor 90 when the clock signal CLK is being inputted.

This output signal of the inhibition circuit 100 is also applied to a NAND circuit 102. The output signal of the NAND circuit 102 is applied to the reset terminal of the RS flip-flop 94. Accordingly, while the ignition switch is in the on state, during which the inhibition circuit 100 applies the signal at the L level to the gate of the transistor 90, the reset terminal of the RS flip-flop 94 is applied with the signal at the H level outputted from the NAND circuit 102. Hence, while the ignition switch is in the on state, since the output of the RS flip-flop 94 does not become H level, the discharge switch 82 can be prevented from being turned on.

In more detail, the NAND circuit 102 receives the output signal of the T flip flop 92 in addition to the output signal of the inhibition circuit 100 to generate an inverted version of a logical product of the output signal of the inhibition circuit 100 and the output signal of the T flip-flop 92. Accordingly, the RS flip-flop 92 outputs the H level signal only when the output of the inhibition circuit 100 is at the H level, and the output of the T flip-flop 92 is at the H level.

The configuration described above makes it possible to inhibit the discharge process while the ignition switch is in the on state, when the clock signal CLK is being inputted to the management unit. In addition, when the ignition switch is in the off state, it is possible to command the management unit Ui to perform the discharge process by turning on the switching devices Si, S(i+1), if it is required to discharge the battery cells Bi1 to Bim. Preferably, the discharge process is performed such that the inter-terminal voltages of all the blocks are detected by use of the flying capacitor 14 after the ignition switch is turned off, and a block whose inter-terminal voltage is higher than that of the others is discharged. In this case, the clock signal CLK is outputted from the microcomputer 24 while the inter-terminal voltages are detected so that the inhibition circuit 100 inhibits the discharge process from being performed during this period.

The first embodiment of the invention described above offers the following advantages.

(1) When the switching devices Si, S(i+1) are turned on, the management unit Ui performs a management process of the battery cells Bi1 to Bim other than the voltage detection process of the battery cells Bi1 to Bim. Since it means that a command signal commanding to perform the voltage detection process, and a command signal commanding the management unit Ui to perform a management process (discharge process, for example) other than the voltage detection process can be transmitted to the management unit Ui through the same line, it becomes unnecessary to additionally provide a device for providing insulation between the microcomputer 24 and the management unit Ui to enable transmitting the command signal to perform the management process.

(2) The command signal can be transmitted as presence or absence of a current on the connection line CLi.

(3) This embodiment is provided with the level conversion circuit 84 converting the current flowing through the connection line CLi into a voltage having a certain voltage level, and the T flip-flop 92 latching the voltage outputted from the level conversion circuit 84. This makes it possible to generate the command signal having a constant logic level, even though the current flowing through the connection line CLi decays with time.

(4) The discharge process is performed by turning on the discharge switch 82 in response to such a command signal. Accordingly, it is not necessary to provide any high-voltage insulating device to transmit the command signal commanding to perform the discharge process.

(5) This embodiment is provided with the inhibition circuit 100 inhibiting the discharge switch 82 to be turned on irrespective of whether or not a current flows through the connection line CLi, when the clock signal CLK is being received by the management unit. This makes it possible to prevent the discharge process from being performed unintentionally when the voltage detection process is performed by use of the flying capacitor 14.

Second Embodiment

Next, a second embodiment of the invention is described with reference to FIG. 8. The following description focuses on differences between the first embodiment and the second embodiment.

Figure 8:
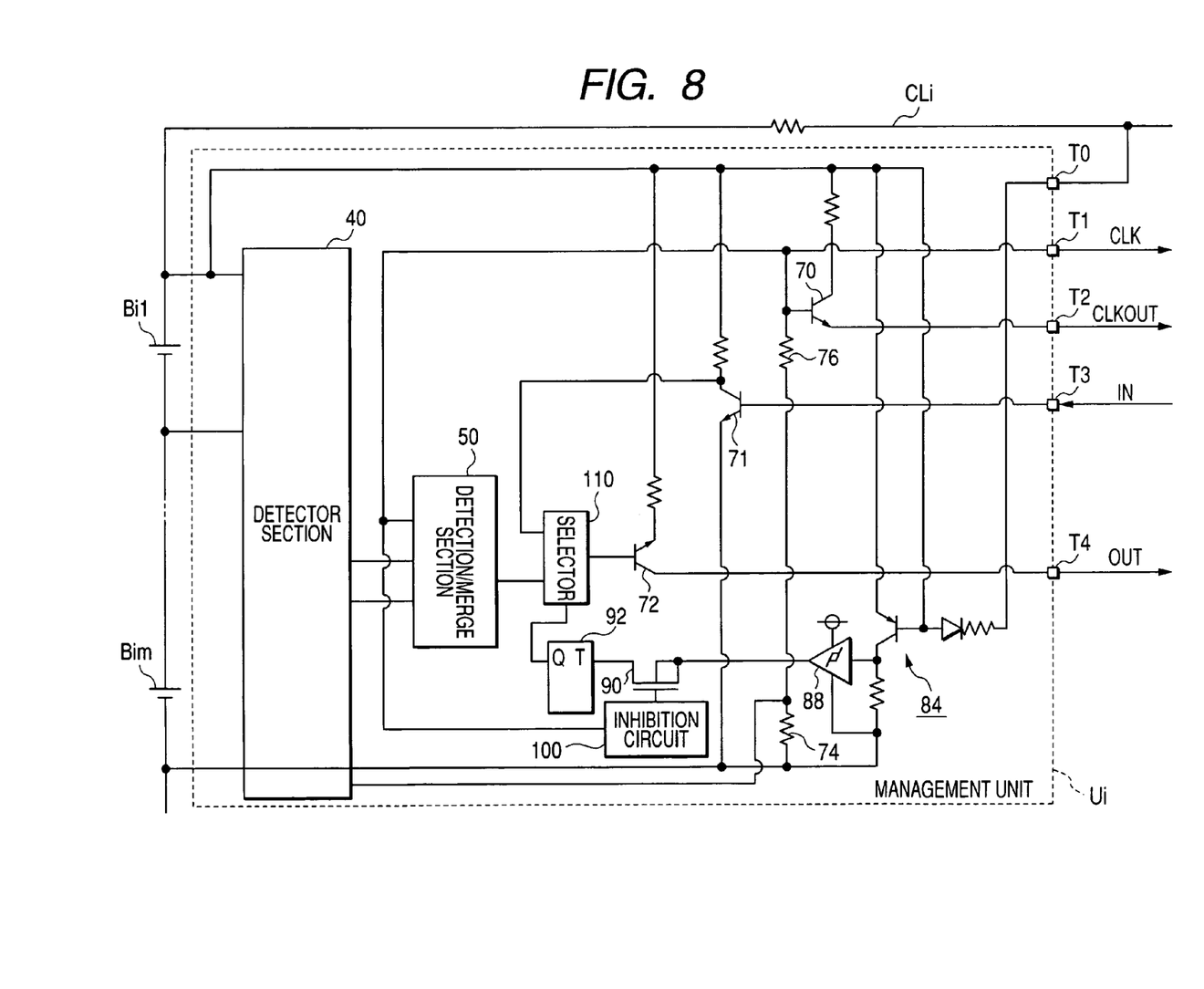
FIG. 8 is a diagram of a part of a management unit of a battery pack management apparatus according to a second embodiment of the invention, which is for performing a process for detecting overcharge and over discharge of the battery cells.

FIG. 8 is a diagram of a part of the management unit Ui, which is for performing a process for detecting overcharge and overdischarge of the battery cells Bi1 to Bim. In FIG. 8, the same reference characters as those in FIGS. 2, and 6 indicate the same or corresponding components.

As shown in this figure, in this embodiment, the output signal of the detection/merge section 50 and the input signal applied to the input terminal T3 are received by a selector 110. The selector 110 selectively outputs one of these two signals to the output terminal T4. This configuration makes it possible that the output signal of the detection/merge section 50 is delivered through the output terminal T4 only in a specific management unit Ui, while in a management unit Uj(i<j) located downstream of the specific management unit Ui, a level converted version of the output signal of the management unit Ui is delivered.

The switching of the selector 110 is performed depending on whether or not a current flows through the connection line CLi as explained below. When a current flows through the connection line CLi, this current is converted to a voltage having a constant voltage level by the level conversion circuit 84 and the buffer circuit 88, and then supplied to the T flip-flop 92 through the transistor 90. The selector 110 is switched in accordance with the output signal of the T flip-flop 92.

When the clock signal CLK is being inputted to the management unit, the transistor 90 is turned on by the inhibition circuit 100. In the second embodiment, it becomes possible to send the output signal of the detection/merge section 50 to the microcomputer 24 by causing the microcomputer 24 to output the clock signal CLK to turn on the transistor 90, and by turning on the switching devices Si, S(i+1).

The second embodiment offers substantially the same advantages (1) to (3) offered by the first embodiment.

Third Embodiment

Next, a third embodiment of the invention is described with reference to FIG. 9. The following description focuses on differences between the second embodiment and the third embodiment.

In the third embodiment, one of the output signal of the OR circuit 48 and the output signal of the AND circuit 49 shown in FIG. 3 is selectively delivered through the output terminal T4 in a specific management unit Ui. This enables the microcomputer 24 to detect such an abnormality that the output of the OR circuit 48 is at the L level even though the output of the AND circuit 49 is at the H level, in order to check whether or not the management unit Ui is operating normally.

Figure 9:
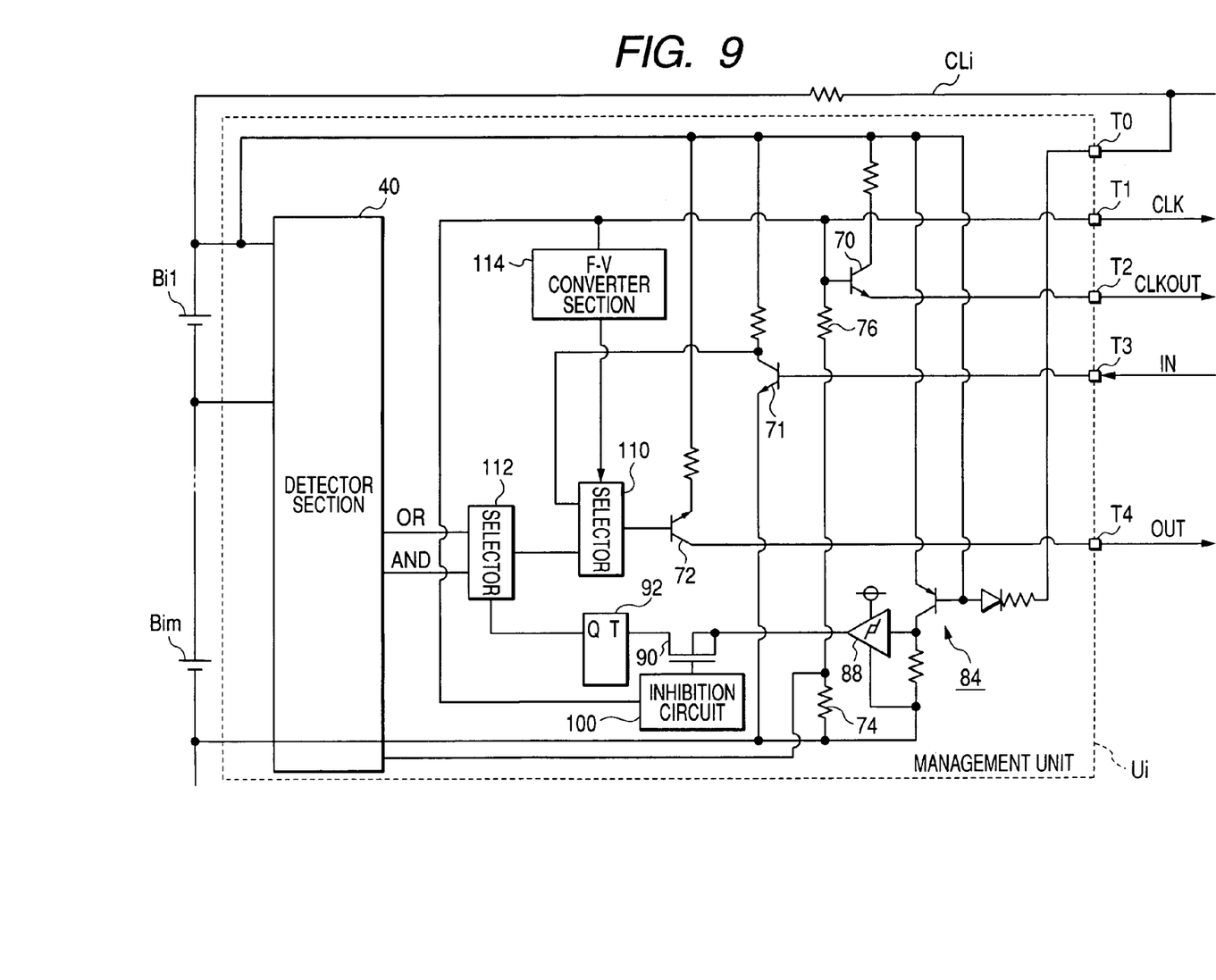
FIG. 9 is a diagram of a part of a management unit of a battery pack management apparatus according to a third embodiment of the invention, which is for performing a process for detecting overcharge and over discharge of the battery cells.

FIG. 9 is a diagram of a part of the management unit Ui, which is for performing a process for detecting overcharge and overdischarge of the battery cells Bi1 to Bim. In FIG. 9, the same reference characters as those in FIG. 8 indicate the same or corresponding components.

In the third embodiment, one of the output signal of the OR circuit 48 and the output signal of the AND circuit 49 of the detector section 40 is selected by a selector 112. One of the output signal of this selector 112 and the signal received at the input terminal T3 is selected by the selector 110, and delivered through the output terminal T4.

Also in this embodiment, the clock signal CLK is frequency-modulated in order to superimpose, on this clock signal CLK, a command signal designating which one of the blocks should be selected. The management unit Ui is provided with an F-V converter section 114 operating to decode the clock signal CLK to generate a voltage signal which is used to switch the selector 110.

On the other hand, the selector 112 is switched by the output signal of the T flip-flop 92. As explained above, in this embodiment, the command signal designating which of the output signal of the OR circuit 48 and the output signal of the AND circuit 49 should be selected is transmitted as presence or absence of a current on the connection line CLi.

The third embodiment offers substantially the same advantages (1) to (3) offered by the first embodiment.

Other Embodiments

In the above described embodiments, presence or absence of a current on the connection line CLi may be used to transmit a command to change the threshold voltage for detecting overcharged state or the overdischarged state. Incidentally, if the present invention is applied to the invention disclosed in the aforementioned Japanese Patent Application Laid-open No. 2003-32907, the insulating devices respectively provided in the photo coupler 30 and the reference voltage generating circuit 58 for providing insulation between the battery pack side and the lower voltage side in that invention can be eliminated.

In each of the above described embodiments, the command signal is transmitted in the binary form as presence or absence of a current on the connection line. However, a multilevel command signal can be transmitted by frequency-modulating an inverting frequency of the voltage across the flying capacitor 14, if the switching frequency of the switching devices S1 to S(n+1) are made variable.

The detection of the voltage across the block including the battery cells Bi1 to Bim can be performed by use of a technique different from the one that uses the flying capacitor 14. For example, the above embodiments may be provided with an A/D converter for converting the voltage across a selected block, and an optical insulation device such as a photocoupler, or a magnetic insulation device such as a transformer through which the AD/converted voltage is sent to the microcomputer. Also in this case, it is possible to transmit, to a specific management unit Ui, a command signal commanding to perform a management process other than the voltage detection process that uses the voltage detector circuit 16, when it is required to detect the voltage across the block including the battery cells Bi1 to Bim.

The above described embodiments may be so configured that not the voltage across the block including the series connection of the battery cells Bi1 to Bim, but the voltage across each one of these series-connected battery cells is detected. In this case, when one of the battery cells Bi1 to Bim is selected, a command signal commanding to perform a management process other than the voltage detection process is transmitted to the management unit Ui.

Although the battery pack management apparatus has been described as being used for a hybrid vehicle in the above described embodiments, the management apparatus of the invention can be used for an electric vehicle.

The above explained preferred embodiments are exemplary of the invention of the present application which is described solely by the claims appended below. It should be understood that modifications of the preferred embodiments may be made as would occur to one of skill in the art.

What is claimed is:

1. A battery pack management apparatus for managing a battery pack including a series connection of battery cells, said battery pack management apparatus being provided with a management unit for each of unit batteries each of which includes a single battery cell or a plurality of adjacent battery cells included in said battery pack, said battery pack management apparatus comprising:
a selection circuit selecting one of said unit batteries; and
a voltage detection circuit detecting a voltage across said selected unit battery; wherein
said management unit provided for said selected unit battery is configured to perform a management process other than detection of said voltage across said selected unit battery on said selected unit battery;
said management unit includes a conversion circuit converting said current on a connection line into a voltage, and a latch circuit latching said voltage converted by said conversion circuit, an output of said latch circuit being used as a command signal commanding said management unit to perform said management process;
said management process is a process for discharging said selected unit battery;
said battery cells are rechargeable batteries, and wherein said management unit includes a discharge path through which said selected unit battery is discharged, a discharge switch making a closed loop between said selected unit battery and said discharge path when being turned on, and a drive circuit turning on said discharge switch to thereby discharge said selected unit battery in response to said command signal; and
said battery pack management apparatus includes a control circuit outputting a clock signal, and said management unit includes a comparator circuit comparing said voltage across said selected unit battery with one of two different threshold values selected in accordance with a logic value of said clock signal, and outputting a comparison result signal indicative of whether or not said selected unit battery is in an overcharged state or an overdischarged state to said control unit, and an inhibition circuit inhibiting said discharge switch from being turned on while said management unit is supplied with said clock signal from said control circuit.

2. A battery pack management apparatus for managing a battery pack including a series connection of battery cells, said battery pack management apparatus being provided with a management unit for each of unit batteries each of which includes a single battery cell or a plurality of adjacent battery cells included in said battery pack, said battery pack management apparatus comprising:
a selection circuit selecting one of said unit batteries excluding said management units; and
a voltage detection circuit detecting a voltage across said selected unit battery;
a connection line connecting the selected battery unit, the selection circuit and the voltage detection circuit to form a closed loop formed between the selected unit battery and the voltage detection circuit though the selection circuit, wherein the connection line branches between a terminal of the selected unit battery and the selection circuit so that a current flowing through the connection line due to a voltage difference between the terminal of selected battery unit and the voltage detection circuit is received by a terminal of the management unit;
wherein said management unit is configured to use, as a command signal regarding administration of said selected unit battery, the voltage difference between the terminal of said selected unit battery and said voltage detection circuit occurring due to the current flowing through the connection line to the management unit when said one of said unit batteries to be monitored by said management unit is selected by said selection circuit.

3. The battery pack management apparatus according to claim 2, wherein said voltage detection circuit includes a flying capacitor, said selection circuit is configured to connect both terminals of said flying capacitor to both terminals of said selected unit battery through the connection line.

4. The battery pack management apparatus according to claim 3, wherein said management unit includes an output circuit outputting said detected voltage across said connection line, and a latch circuit latching an output of said output circuit, an output of said latch circuit being used as said command signal.

5. The battery pack management apparatus according to claim 2, wherein said battery cells are rechargeable batteries, and wherein said management unit includes a discharge path through which said selected unit battery is discharged, a discharge switch making and breaking a closed loop between said selected unit battery and said discharge path, and a drive circuit turning on and off said discharge switch in response to said command signal, said discharge switch being turned on in accordance with said command signal.

6. A battery pack management apparatus for managing a battery pack including a series connection of battery cells, said battery pack management apparatus being provided with a management unit for each of unit batteries each of which includes a single battery cell or a plurality of adjacent battery cells included in said battery pack, said battery pack management apparatus comprising:
a selection circuit selecting one of said unit batteries excluding said management units; and
a voltage detection circuit detecting a voltage across said selected unit battery;
wherein said management unit is configured to use, as a command signal regarding administration of said selected unit battery, a voltage difference between a side of one terminal of said selected unit battery and a side of said voltage detection circuit occurring due to a current flowing through an electrical connection path between said side of said one terminal and said side of said voltage detection circuit when said one of said unit batteries to be monitored by said management unit is selected by said selection circuit;

wherein said battery cells are rechargeable batteries, and wherein said management unit includes a discharge path through which said selected unit battery is discharged, a discharge switch making and breaking a closed loop between said selected unit battery and said discharge path, and a drive circuit turning on and off said discharge switch in response to said command signal, said discharge switch being turned on in accordance with said command signal; and wherein said battery pack management apparatus includes a control circuit outputting a clock signal, and said management unit includes:

a comparator circuit comparing said voltage across said selected unit battery with one of first and second threshold values selected in accordance with a logic value of said clock signal, said first threshold value being for determining whether said selected battery unit is in an excessively high voltage state, said second threshold value being for determining whether said selected battery unit is in an excessively low voltage state, said comparator circuit outputting a comparison result signal indicative of whether or not said selected unit battery is in an overcharged state or an overdischarged state to said control unit; and an inhibition circuit inhibiting said discharge switch from being turned on while said management unit is supplied with said clock signal from said control circuit irrespective of said command signal.

7. The battery pack management apparatus according to claim 2, wherein the connection line branches between the terminal of the selected unit battery and the selection circuit to be connected to the management unit.

* * * * *